United States Patent [19]

Sugaya et al.

[11] Patent Number: 4,737,869
[45] Date of Patent: Apr. 12, 1988

[54] MAGNETIC DISK HAVING DATA AREA AND INDEX SERVO AREA AND SERVO SYSTEM FOR POSITIONING READ/WRITE HEAD ON MAGNETIC DISK

[75] Inventors: Toshihiro Sugaya; Nobuyuki Takagi, both of Tokyo; Norio Nakamura; Kazunori Moriya, both of Yokohama, all of Japan

[73] Assignee: Kabushiki Kaisha Toshiba, Kawasaki, Japan

[21] Appl. No.: 841,820

[22] Filed: Mar. 20, 1986

[30] Foreign Application Priority Data

Mar. 20, 1985 [JP] Japan ................................. 60-54322
Sep. 30, 1985 [JP] Japan ................................ 60-216521

[51] Int. Cl.⁴ ..................... G11B 21/10; G11B 5/596; G11B 5/82
[52] U.S. Cl. ........................................ 360/77; 360/135
[58] Field of Search ...................... 360/77, 78, 135, 48

[56] References Cited

U.S. PATENT DOCUMENTS

| | | |
|---|---|---|
| Re. 32,075 | 1/1986 | Harrison et al. ...................... 360/77 |
| 4,001,883 | 1/1977 | Strout et al. .......................... 360/48 |
| 4,157,577 | 6/1979 | Porter, Jr. et al. .................... 360/77 |
| 4,380,034 | 4/1983 | Krake .................................... 360/77 |
| 4,488,187 | 12/1984 | Alaimo ................................. 360/77 |
| 4,530,020 | 7/1985 | Sutton ............................ 360/135 X |
| 4,589,037 | 5/1986 | Jen et al. .............................. 360/77 |

FOREIGN PATENT DOCUMENTS 57-127971 8/1982 Japan.
60-113370 6/1985 Japan.

OTHER PUBLICATIONS

Refined Closed-Loop Servo Enhances Low-Cost Disk Drive's Accuracy, Larry Sarisky, SyQuest Technology, Fremont, Calif., U.S. Electronic's/Mar. 10, 1983, pp. 139-142.

Primary Examiner—Raymond F. Cardillo
Assistant Examiner—Steven R. Garland
Attorney, Agent, or Firm—Oblon, Fisher, Spivak, McClelland & Maier

[57] ABSTRACT

A magnetic disk comprises a data area and a single index servo sector area embedded in the data area. The servo sector has three or more servo information pattern sections formed side by side in the direction of data tracks in the data area. The servo information pattern sections each have a plurality of servo information bit cells formed in a predetermined pattern in a direction perpendicular to the direction of data tracks. The servo information bit cells are used to produce a position signal for positioning a read/write head. A servo system for positioning the read/write head averages a plurality of position signals obtained from the servo information pattern sections and uses the averaged position signal for positioning the read/write head.

13 Claims, 8 Drawing Sheets

F I G. 4
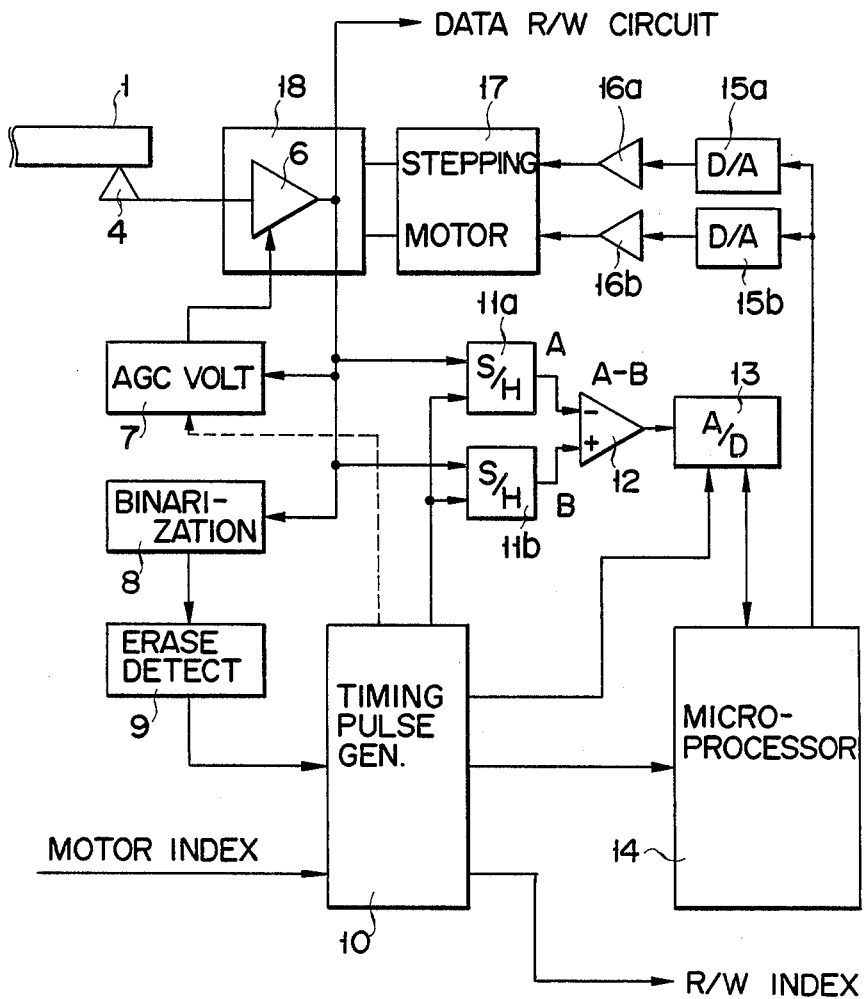

MAGNETIC DISK HAVING DATA AREA AND INDEX SERVO AREA AND SERVO SYSTEM FOR POSITIONING READ/WRITE HEAD ON MAGNETIC DISK

BACKGROUND OF THE INVENTION

This invention relates to a magnetic disk for an index servo system and also to an index servo system for positioning a read/write head, i.e., a transducer, on the magnetic disk.

In the field of small size magnetic disk devices, a simple open-loop positioning system, which employs a stepping motor for driving a magnetic head in the radial direction of the disk, has been used for positioning the head on the disk. With this positioning system, the positioning accuracy depends solely on the head-feeding accuracy of the stepping motor. This means that a thermal off-track error occurs due to thermal expansion and contraction the disk inevitably occurs to a great extent, making it difficult to increase the track density of the disk.

In order to permit accurate positioning of a head on a disk having a high track density, embedded servo systems, have been proposed, which use servo information embedded in part of a disk area and adapted for positioning the head. Such embedded servo systems include a sector servo system, in which a disk has a plurality of servo sectors and the servo information is embedded in each of the servo sectors, and an index servo system, in which the servo information is provided in a single servo area of the disk.

In the servo sector system, the head can be accurately positioned on a data track of the disk irrespective of thermal off-track or eccentricity of the disk because of the provision of a plurality of servo sectors. For this reason, this system is suited for a magnetic disk device of disk exchange type. However, since servo information is embedded in each servo sector, it is impossible to format a disk with a soft-sector interface. This means that it is impossible to use any existing controller.

With the index servo type, on the other hand, since the servo information is formed in the index area alone, it is impossible to follow the eccentricity of the disk. However, in the field of stationary magnetic disk devices which occupy a considerable proportion of small size magnetic disk devices, the index servo system permits high-precision positioning of the head irrespective of the thermal off-track. In addition, it is possible to format the disk using an existing controller. Heretofore, various index servo systems have been proposed.

One such index servo system is an embedded servo system, called "Digilok", as disclosed in U.S. Pat. No. 4,488,187 issued Dec. 11, 1984. According to this Digilok servo technique, head position information is obtained through counting of pulses obtained by reading burst-type servo information embedded in an index area. Thus, accurate servo control can be attained with relatively simple digital circuits. Since pulse counts represent a head position, however, it is necessary to record the burst-like servo information obliquely with respect to tracks. For this reason, a considerable time is required for writing the servo information. In addition, a dropout of servo information will occur a positioning error.

Japanese Laid-Open Patent Publication No. 60-113370 published June 19, 1985 discloses a different index servo technique. In this technique, two burst-like servo information patterns A and B are recorded on adjacent tracks in an index area of a disk such that they will not overlap each other in the extending direction of tracks. Servo patterns A and B are each formed with deviation from a data track of the data area by one half of the track pitch. To obtain head position information, output signals of the head, corresponding to servo information A and B, are rectified and averaged (i.e., integrated). A difference between amplitude values of servo signals corresponding to servo information A and B is calculated, and an off-track amount of the head is obtained according to the difference data. With this technique, the averaging of signal cannot be attained sufficiently if each of the servo patterns A and B has an insufficient bit number (burst number). For this reason, when a bit or bits in a servo pattern are dropped out head positioning errors will occur. Further, signal waveforms obtained from the servo patterns are different between the inner and outer sides of the disk. Therefore, the rectification and averaging of servo information are liable to cause position signal error between the inner and outer sides of the disk.

A copending U.S. patent application Ser. No. 469,144 filed on Feb. 23, 1983, now U.S. Pat. No. 4,499,511 and entitled "SYSTEM FOR DETECTING POSITION OF A READ-WRITE HEAD IN SEEK OPERATION ON A DISK MEMORY HAVING DATA AND SERVO SECTORS", and assigned to the same assignee as this application, discloses an improved servo system for a disk having concentric tracks.

A copending U.S. patent application Ser. No. 586,440 filed on Mar. 5, 1984, entitled "SYSTEM FOR DETECTING THE POSITION OF A READ-WRITE HEAD ON A DISK RECORDING MEDIUM HAVING DATA AND SERVO SECTORS" and assigned to the same assignee as this application discloses an improved servo system for a disk having concentric tracks.

A copending U.S. patent application Ser. No. 807,998 filed on Dec. 12, 1985, now U.S. Pat. No. 4,636,885 entitled "SERVO SYSTEM FOR A MAGNETIC DISK MEMORY HAVING SPIRAL TRACKS" and assigned to the same assignee as this application discloses an improved servo system for a magnetic disk having spiral tracks.

SUMMARY OF THE INVENTION

An object of the invention is to provide a magnetic disk for index servo, which has servo information patterns permitting accurate positioning of a magnetic head.

Another object of the invention is to provide an index servo system which permits accurate positioning of the magnetic head.

A magnetic disk according to the invention comprises a data area having data tracks formed at a predetermined track pitch for writing and reading information using a read/write head, and a single index servo area embedded in the data area and bearing servo information patterns utilized for the positioning of the read/write head. The index servo area comprises three or more servo information pattern sections formed side by side in the extending direction of data track. The servo information pattern sections each have a plurality of servo information bit cells formed in a predetermined pattern to extend in a direction perpendicular to the extending direction of data track. Each bit cell has a width smaller than or equal to the data track pitch. The servo information bit cells in each of the servo information pattern sections are used for producing position signals adapted for the positioning of the read/write head.

A servo system for positioning the read/write head is arranged to average a plurality of position signals derived from the bit cells in the servo information pattern sections and to position the read/write head according to an average position signal.

BRIEF DESCRIPTION OF THE DRAWINGS

FIG. 4 is a block diagram of a servo system for positioning a read/write head on the magnetic disk according to the invention;

DETAILED DESCRIPTION OF THE PREFERRED EMBODIMENT

Figure 1:
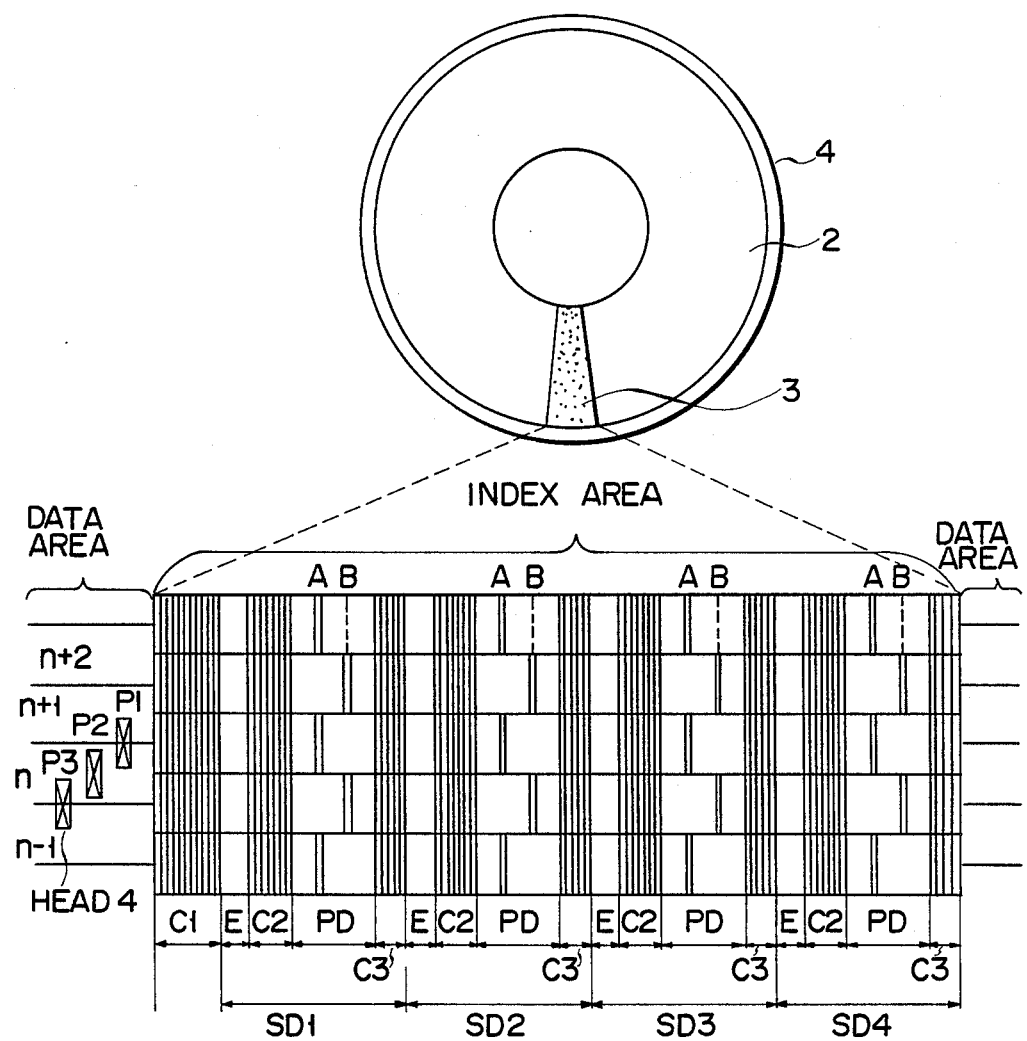
FIG. 1 shows a magnetic disk with an index servo area and servo patterns formed in the index servo area according to an embodiment of this invention.

Referring to FIG. 1, a magnetic disk 1 embodying the invention, comprises a data area 2 having concentric data tracks and an index servo area 3. Index servo area 3 is provided in part of data area 2 on the disk surface. In this embodiment, index servo area 3 has four servo information pattern sections SD1 to SD4 which are arranged side by side in a direction in which the tracks extend. Synchronizing section C1 is provided between servo information pattern section SD1 and data area 2. Each servo information pattern section comprises erase section E, synchronizing section C2, position information detection section PD and synchronizing section C3. These sections are arranged side by side as shown. Lines drawn perpendicular to the tracks in the illustrated index area indicate inversion of magnetization. Synchronizing sections C1 and C3 are each provided for detecting erase section E. Synchronizing section C2 can be utilized for generating an AGC (automatic gain control) voltage which is used for adjusting the amplitude of position information signals which are subsequently read out. Erase section E provides a timing reference for holding the peak of a position signal, corresponding to position information bit cells A and B, read out from position information detection section PD. Two position information bit cells A and B which are of a dibit configuration have substantially the same width as the track pitch. They are arranged in a staggered fashion in the radial direction of the disk such that they are deviated from a data track in the data area by one-half track pitch.

Servo information in index area 2 can be written by an exclusive writer called servo writer in synchronism to an index signal. The servo information is written for each track by a servo-writing magnetic head having a track width greater than the track pitch. Servo information is thus written in a partly overlapping fashion so that the width of position information bit cells A and B becomes equal to the track pitch.

Figure 2:
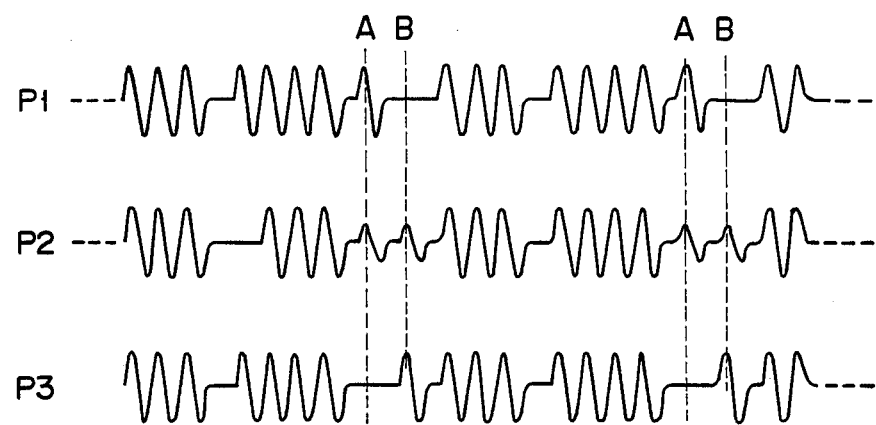
FIG. 2 is a waveform diagram showing signals reproduced from the index servo area of the magnetic disk shown in FIG. 1 by a read/write head of a magnetic disk device at different track positions.

At positions shown at P1 to P3 magnetic head 4 of the disk device, which traces index area 3, provides signal waveforms as shown in FIG. 2. More specifically, when head 4 is at position P1 deviated from track n to track n+1, the position information signal exibits a maximum amplitude for bit cell A and a minimum amplitude for bit cell B. When head 4 is at position P2 or placed accurately on track n, the position information signal exhibits an intermediate level between the maximum and minimum amplitudes. When head 4 is at position P3 deviated from track n toward track n−1, the position information signal has the minimum amplitude for bit cell A and the maximum amplitude for bit cell B.

Figure 3:
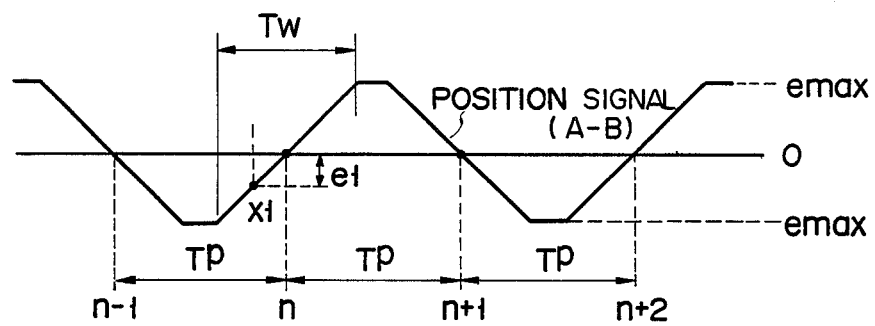
FIG. 3 shows a position signal derived from servo information as a function of track positions.

Peak-holding of the position information signal is done at portions corresponding to bit cells A and B as disclosed in the copending U.S. applications mentioned before, and the difference (A−B) between peak-hold values is obtained as a position signal representing the position of head 4. FIG. 3 shows the position signal (A−B) as a function of the position of head 4 on data tracks. When head 4 is centered on data track n, position signal (A−B) becomes zero. The amount of off-track of the head can be obtained from the ramp portion of the position signal. When the head is at off-track position X1, off-track amount δ of the head is given by $$\delta = (el/2e_{max})TW \quad (1)$$

where TW represents the track width of magnetic head 4, TP the track pitch of data track, $e_{max}$ an absolute maximum level of the position signal and el the level of the position signal. To accurately position head 4 on track n, A and B phase currents in a stepping motor for driving head 4 may be controlled such that el=0. The position signal has opposite polarities in even and odd-numbered tracks.

In this embodiment, as is evident from FIG. 1, the position signal as shown in FIG. 3 is obtained for each of the four servo information pattern sections as the servo area is traced by the head. It is desired to provide three to five servo information pattern sections, preferably four as in this embodiment. The reason for the provision of a plurality of servo information pattern sections as noted above is that in the case of a single servo information pattern section, the possible dropout of a servo bit cell or cells will result in loss of position signal, and thus it becomes no longer possible to position the head on the pertinent track. With the provision of a plurality of servo information pattern sections, the precision of the position signal can be increased. In addition, the noise immunity can be increased by averaging a plurality of position signals. This advantage can be increased by increasing the number of position signals that are averaged. This, however, requires a large servo area. In practice, three to five servo pattern sections are suitable.

FIG. 4 shows an arrangement of a head positioning device for magnetic disk 1 shown in FIG. 1. A signal read out by magnetic head 4 from disk 1 is amplified by amplifier 6 and then applied to AGC voltage generator 7, binarization circuit 8, sample/hold (S/H) circuits 11a and 11b and data read/write circuit (not shown).

AGC voltage generator 7 generates an AGC voltage from a signal obtained form the synchronizing section C1 of the index area to adjust the gain of amplifier 6. This gain control increases the precision of the position signal. The output signal of head 4 is converted in binalization circuit 8 into a binary signal which is fed to erase detection circuit 9. Erase detection circuit 9 may comprise a retriggerable monostable multivibrator, for instance, to detect erase section E of the index area having the longest zero level period in the output signal of binalization circuit 8. An erase detection signal is produced for each servo information pattern section.

Figure 5:
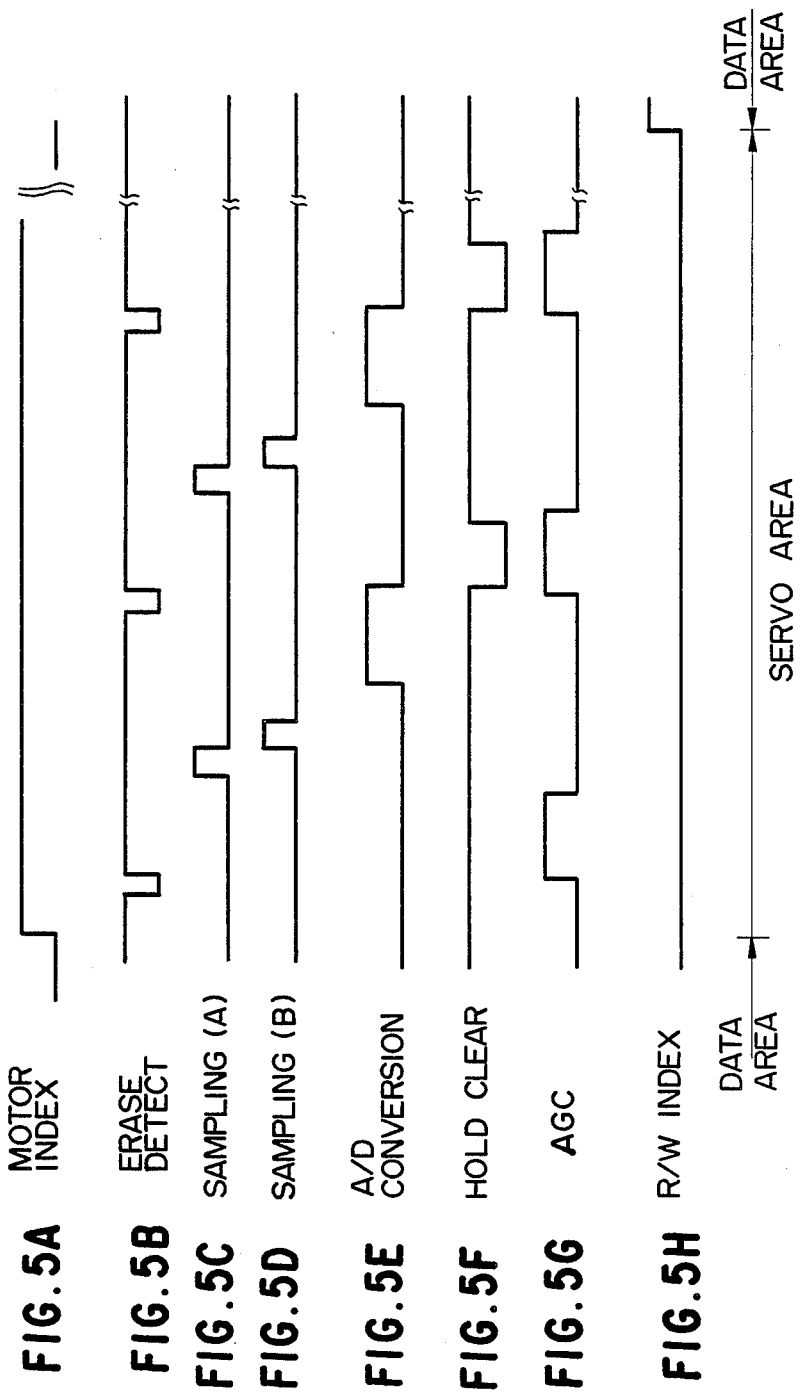
FIG. 5 a–FIG. 5h are a timing diagram useful in understanding the operatiom of the servo system shown in FIG. 4.

The erase detection signal provides a timing reference for decoding the servo information signals. The erase detection signal is fed to timing pulse generator 10, which generates various timing pulses as shown in FIG. 5.

To timing pulse generator 10 is also applied a motor index signal synchronized to the rotation of a disk driving motor and indicating the beginning of the servo area. The motor index signal FIG. 5a is generated through detection of an index hole of the disk. Timing pulse generator 10 generates sampling pulses (A) and (B) FIG. 5C and FIG. 5D for sampling servo information A and B, hold clear data FIG. 5E, A/D conversion command signal FIG. 5E, AGC voltage generator enable signal FIG. 5G, and read/write (R/W) index signal FIG. 5H.

S/H circuits 11a and 11b operate in response to sampling pulses (A) and (B) to sample and hold the output signal of the head at the timings of servo information A and B. An operational amplifier 12 produces a position signal (A−B) from sampled servo information A and B. The position signal is converted into a digital signal by A/D converter 12 in response to the A/D conversion command signal. To facilitate the A/D conversion, the position signal (A−B) is shifted in level in the positive direction by $e_{max}$ as shown in FIG. 3. The four position signals that are obtained from servo information pattern sections SD1 to SD4 are successively A/D converted into digital signals to be fed to microprocessor 14.

The length of each of servo information pattern sections SD1 to SD4 shown in FIG. 1 is set to provide a sufficiently time for allowing the charging of capacitors in S/H circuits 11a to 11b, and the A/D conversion of position signal (A−B).

Microprocessor 14 computes an off-track amount $\delta$ of head 4 from the position signal (A−B) and controls the A and B phase drive currents in stepping motor 17 through D/A converters 15a and 15b and current drivers 16a and 16b. Stepping motor 17 drives head carriage 18 to move magnetic head 4.

Figure 6:
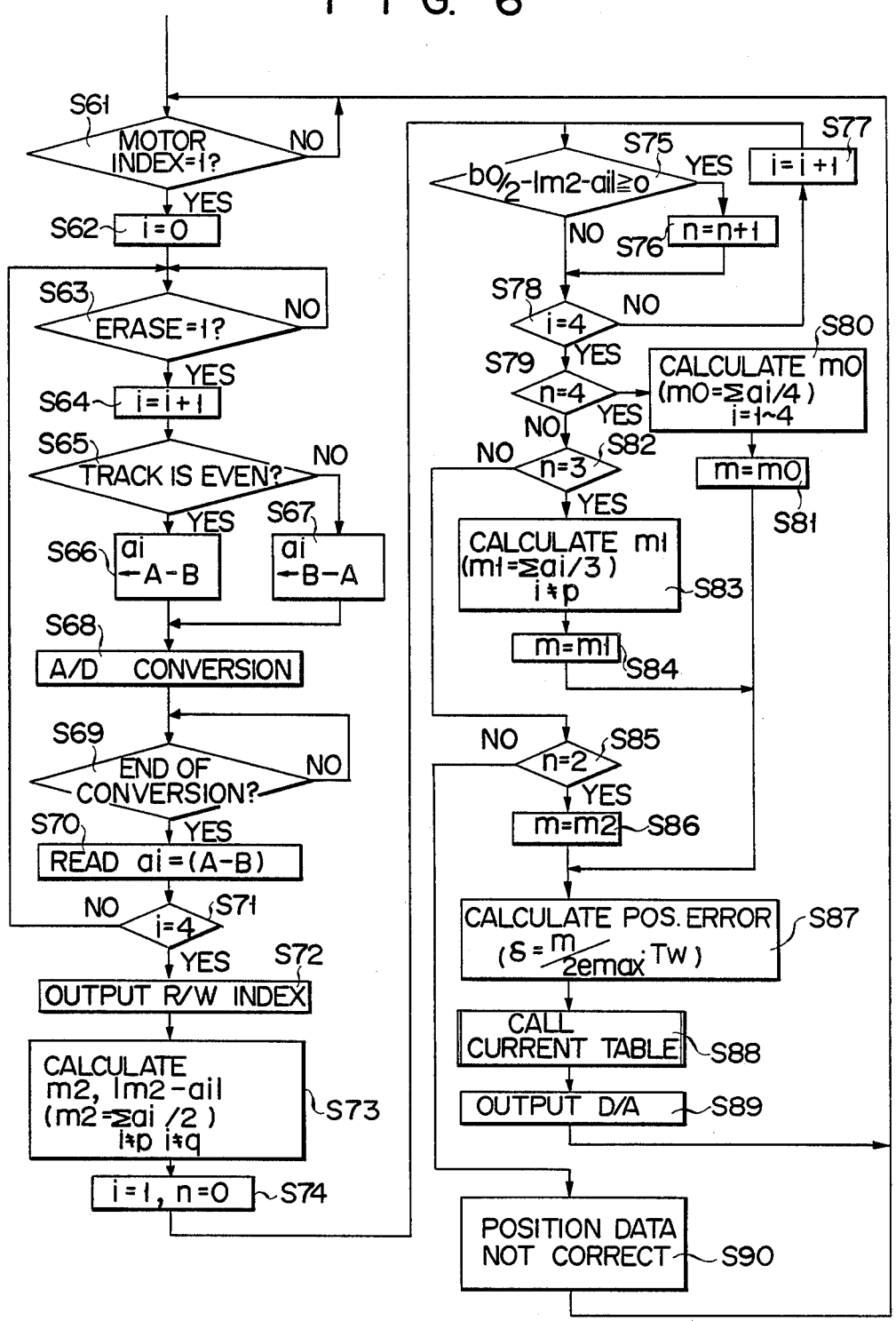
FIG. 6 is a flow chart for explaining the operation of the servo system shown in FIG. 4.

The operation of the microprocessor for the magnetic disk of FIG. 1 having four servo information pattern sections SD1 to SD1, will now be described in detail with reference to the flow chart of FIG. 6.

Position signals obtained from servo information pattern sections SDi (i=1, 2, 3 and 4) are referred to as ai (i=1, 2, 3 and 4). Each position signal is shifted in level to vary between 0 and $2e_{max}$ as noted above. The permissible value of variation in each position signal is set to b0 in advance. Deviation $\delta 0$ of the head position corresponding to the permissible variation in position signal is given by $$\delta 0 = (b0/2e_{max})TW \tag{2}$$

The value of b0 is determined from the considerations of the signal-to-noise ratio, noises externally applied to the magnetic disk device and defects (such as dropouts) of the servo information patterns, and it is selected to be substantially 10% of $2e_{max}$.

In order to eliminate the influence of servo information pattern defects and external noise as much as possible, an operation to be described hereinunder is performed.

When magnetic head 4 enters index area 3 from data area 2, the motor index signal goes high (a logical "1" level), as shown in FIG. 5. In a positioning operation shown in FIG. 6, a check is done in step S61 as to whether the motor index signal is high. This check can be done by an input of timing pulse generator 10, to which the motor index signal is applied. If it is judged that the motor index signal is high, an i-counter in microprocessor 14 for counting position signal ai is reset in step S62. In subsequent step S63, a check is done as to whether head 4 is placed on erase section E of a servo information pattern section. This check is done from the erase section detect signal. When erase section E of servo pattern section SDi is detected, the i-counter is incremented by 1 (step S64). Then, a check is done as to whether head 4 positions on an even track (step S65). This check is done through a check of the count of a counter for counting track number in microprocessor 14.

As mentioned before, the polarity of the output signal of operational amplifier 12 is determined in dependence on whether the head positions on an even or odd track. When head 4 positions on an even track, S/H circuit 11a holds servo information A, while S/H circuit 11b holds servo information B. In this case, operational amplifier 12 produces an output signal (A−B). When the head is placed on an odd track, on the other hand, operational amplifier 12 produces an output signal (B−A). If it is judged in step S65 that the head positions on an even track, timing pulse generator 10 causes S/H circuits 11a 11b to hold respective servo information A and B, so that operational amplifier produces the position signal (A−B) (step S65). When the head is placed on an odd track, timing pulse generator 10 causes S/H circuits 11a and 11b to hold respective servo information B and A, so that operational amplifier 12 produces position signal (B−A) (step S67).

The position signal thus produced is A/D converted in subsequent step S68. When the completion of the A/D conversion is detected in step S69, the position signal (A−B) is read into microprocessor 14 in step S70. The above routine is executed repeatedly for servo information pattern sections SD1 to SD4, whereby position signals a1 to a4 are read into microprocessor 14. In step S74 a check is done as to whether the count of the i-counter is 4, i.e., whether fourth position signal a4 has been read into microprocessor 14.

When all the position signals have been read into microprocessor 14, timing generator 10 generates an R/W index signal in step S72. In subsequent step S73 microprocessor 14 computes the average m2 of two of the four position signals other than maximum and minimum ones ap and aq, as follows:

$$m2 = \Sigma ai/2 \tag{3}$$

Then $|m2-ai|$ is calculated with respect to position signal ai.

A check as to $$b0/2 - |m2 - ai| \geq 0$$

is then done in step S75. Prior to step S75, 1 is set to the i-counter, and an n-counter for counting times n of determination of YES in step S75 is reset in step S74.

Each time YES is made in step S75, the n-counter is incremented by 1 in step S76. Irrespective of the result in step S75, a check is done in step S78 as to whether the count of the i-counter is 4. If the count is not 4, the i-counter is incremented by 1 in step S77. The check in step S75 is executed for the four position signals through. steps S76, S77 and S78.

When the determination in step S75 has been carried out with respect to the four position signals, a check is done in step S79 as to whether the count of the n-counter is 4. If the count is 4, step S80 is executed, in which the average value $m0 = \Sigma ai/4$ of the four position signals is calculated. This average value is stored in step S81 as a variable m (m=m0) for obtaining off-track amount δ. If the number of position signals that satisfy the condition of step S75 is 3, the routine goes through step S82 to step S83. In step S83, the average value m1 of three position signals satisfying the condition of step S75 is calculated. The average value m1 thus obtained is stored as a variable for obtaining the off-track amount in step S84. If n=2 in step S85, the value m2 calculated in step S73 is stored in step S86 for the calculation of the off-track amount.

In step S87 the off-track amount (i.e., position error) is calculated according to the number of position signals satisfying the condition of step S75 as follows:

$$\delta = (m/2e_{max})TW$$

In subsequent step S88, microprocessor 15 refers to a current table, which is utilized for driving stepping motor 17 to reduce off-track amount δ to zero, and reads out current data corresponding to off-track amount δ. Microprocessor 14 feeds this current data to D/A converters 15a and 15b.

When three or more of the four position signals fail to satisfy the condition of step S75, it is judged in step S90 that the position signal derived from the servo area is not correct, so that the stepping motor phase currents are not changed.

The servo information patterns of the magnetic disk shown in FIG. 1 are written by an exclusive servo writing device. When writing the servo information the servo writing device is load into the magnetic disk device to write the servo information by means of an exclusive servo-writing head. Therefore, the magnetic disk device should have a shape and a mechanism suited for introducing the servo writing device into it. In addition, the writing of the servo information is timeconsuming. Therefore, it is very economical to write the servo information patterns using the read/write head of the magnetic disk device.

Figure 7:
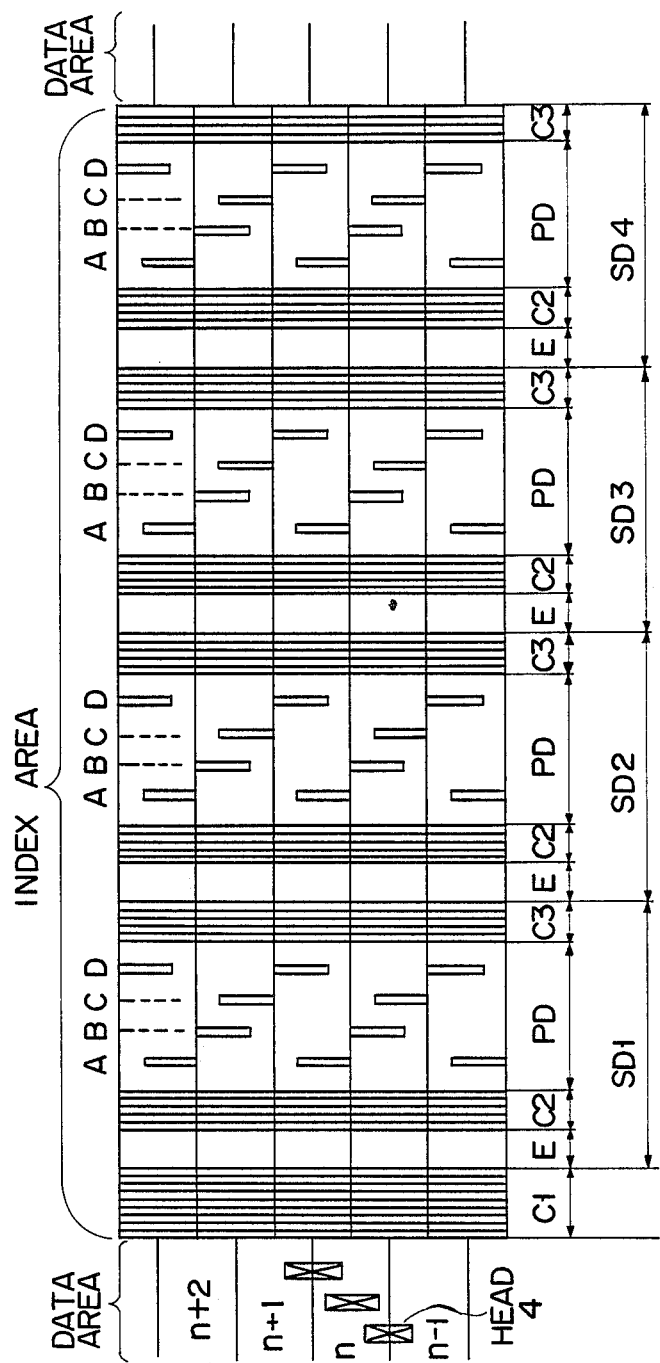
FIGS. 7 and 8 show servo information patterns in the index servo area according to other embodiments of this invention.
Figure 8:
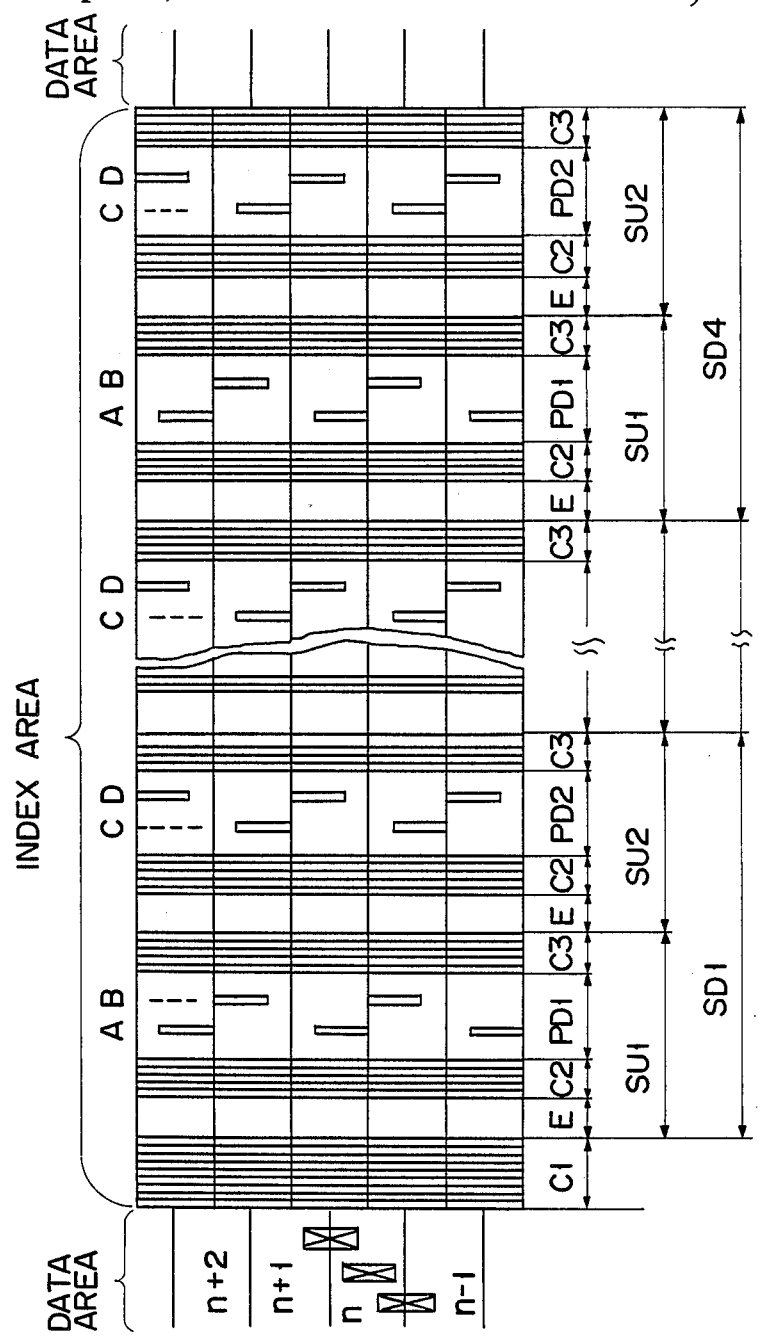

FIGS. 7 and 8 show index areas of magnetic disks having an arrangement similar to the arrangement of the disk shown in FIG. 1, which have servo information patterns suitable for writing by the read/out write head of the disk device. In the example of FIG. 7, four position bit cells A to D are formed in position information detection section PD of each of servo information pattern sections SD1 to SD4. It should be noted that, in the example of FIG. 1 described before, bit cells A and B have a width (in the direction perpendicular to the length direction of track) equal to the track pitch but greater than the track width of head 4 because they are written by an exclusive servo writing head, while, in the example of FIG. 7, the bit cells have a width smaller than the track pitch but equal to the track width of head 4 because they are written by magnetic head 4.

Bit cells A are formed such that they have an end located on the center lines of alternate data tracks (even: n+2, n, n−2) and extend toward the data tracks (odd: n+3, n+1, n−1), and likewise, bit cells B are formed such that they have an end located on the center lines of the data tracks associated with bit cells A and extend toward the data tracks (n+1, n−1). In other words, bit cells A and B are formed such that they extend from the center lines of even data tracks (n+2, n) in the opposite directions at a width equal to the track width of magnetic head 4. Bit cells C and D, on the other hand, are formed such that they extend from the center lines of odd data tracks (n+1, n−1) in the opposite directions at a width equal to the track width of head 4.

A method of forming such servo information pattern will now be briefly described. Synchronizing sections C1, C2 and C3 can be formed as shown by overlap writing using magnetic head 4. Servo information bit cell A is formed by accurately positioning magnetic head 4 on an even track (n+2, n, n−1), then shifting the head toward the succeeding odd track (n+3, n+1, n−1) by one half the head width and then writing at a predetermined position in position information detection section PD. Position information detection section PD has been erased before writing of the servo information bit cells. Bit cell B is formed by accurately positioning magnetic head 4 on an even track (n+2, n, n−2), then shifting the head in the opposite direction to that in the writing of bit cell A by one half the head width and writing at a predetermined position in position information detection section PD. Bit cell C is formed by shifting magnetic head 4 from the accurate position on an odd track (n+1, n−1) toward the even track (n+2, n) by one half the head width and then writing at a predetermined position in position information detection section PD. Bit cell D is formed by shifting magnetic head 4 from the accurate position on an odd track (n+1, n−1) toward the even track (n, n−2) by one half the head width and then writing at a predetermined position.

With the servo system shown in FIG. 4, a position signal (A−B) is used for obtaining off-track amount δ of magnetic head 4 with respect to even tracks (n+2, n, n−1), while a position signal (C−D) is used with respect to odd tracks (n+1, n−1). In this case, head position error δ can be obtained with the same degree of precision as in the case of FIG. 1. Servo information bit cells A and B are held by respective S/H circuits 11a and 11b. Likewise, servo information bit cells C and D are held by S/H circuits 11a and 11b. Unlike the case of using the disk shown in FIG. 1, there is no need of inverting the polarity of the position signal between even and odd tracks.

In the example of FIG. 8, servo information patterns SD1 to SD4 each have first and second servo pattern sub-sections SU1 and SU2. First servo pattern sub-section SU1 has erase section E, synchronizing section C2, position information detection section PD1 and synchronizing section C3. Second servo pattern subsection SU2 has erase section E, synchronizing section C2, position information detection section PD2 and synchronizing section C3. Servo information bit cells A and B as shown in FIG. 7 are formed as a first pair of bit cells in first position information detection section PD1, while servo information bit cells C and D are formed as a second pair of bit cells in second position information detection section PD2. Again in this case, position signal (A−B) obtained from servo bit cells A and B are used for obtaining the off-track amount of the head with respect to the even tracks, and position signal (C−D) obtained from servo bit cells C and D with respect to the odd tracks.

The servo information patterns shown in FIGS. 7 and 8 can be written by the read/write head without the need for a servo writer. The servo information patterns enable accurate positioning of the read/written head as in the case of servo information patterns written by the servo writer.

To write the servo patterns shown in FIGS. 7 and 8, however, a clock signal is required to be written on a predetermined portion of a magnetic disk by means of an exclusive head prior to writing of the servo information pattern by the read/write head. The servo information pattern of FIGS. 7 or 8 is written by the read/write head in synchronism with the clock signal read by the exclusive clock-signal writing head. To write the servo information pattern of FIGS. 7 or 8, therefore, a clock-signal writing head is additionally required.

Figure 9:
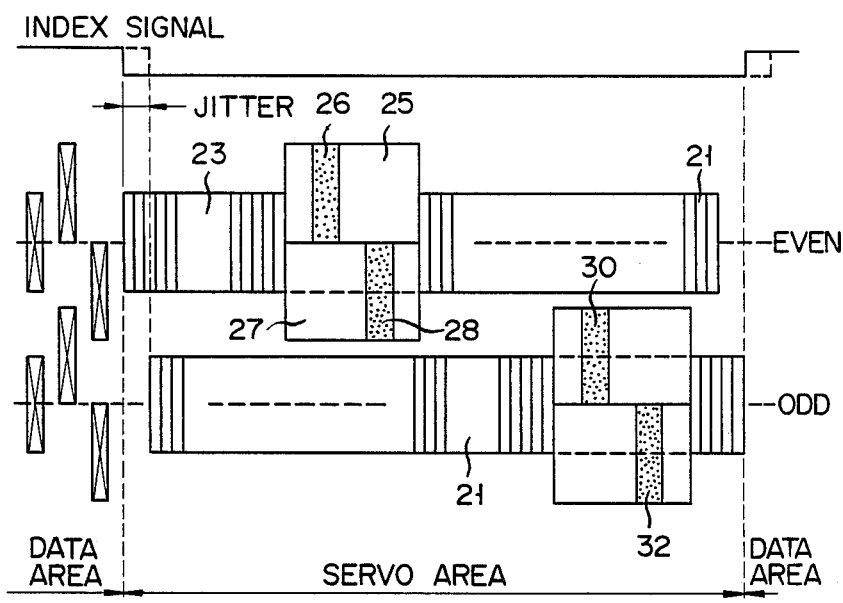
FIGS. 9 and 10 show servo information patterns in the index servo area according to further embodiments of the invention.
Figure 10:
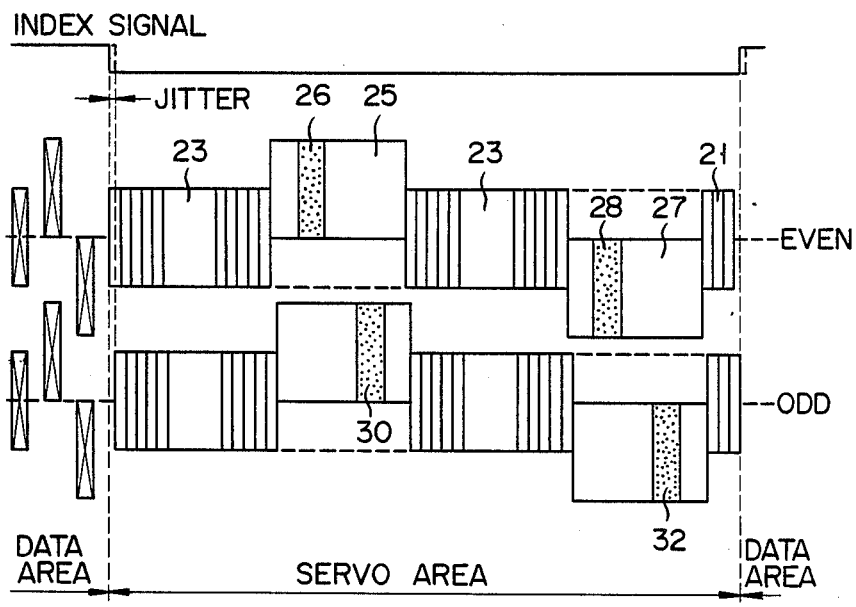

FIGS. 9 and 10 show servo information patterns which can be written only by a read/write head without the need for a clock-signal writing head. With the servo information patterns, a synchronization pattern 21 is first written except erase portions 23 and position information detecting portions 25 and 27 and then position information bit cells 26 and 28 are written in the position information detecting portions 25 and 27 after shifting the read/write head, in a direction of the width of the track on which the synchronization pattern has been written, by a distance one half the track width. As will be evident the read/write head is shifted in opposite directions to write the servo information bit cells 26 and 28. Servo information bit cells 30 and 32 for a neighboring track are written in the same manner.

What is claimed is:

1. A magnetic disk used for writing and reading information by a read/write head comprising:
    a data area, adapted for writing and reading information by said read/write head, having tracks formed at a predetermined track pitch; and
    a single index servo sector embedded in said data area and having servo information patterns utilized for positioning said red/write head on a selected track;
    wherein said index servo sector includes at least three servo information pattern section arranged side by side in the direction in which each of said tracks extends, said servo information pattern sections each having at least one pair of servo information bit cells formed in a predetermined pattern in a direction perpendicular to the direction in which each of said tracks extends, said servo information bit cells each having a width equal to or smaller than the track pitch a pair of servo information bit cells of each of said servo information pattern sections being adapted to produce a position signal representing a difference between signals reproduced by said read/write head from said servo information bit cells, and position signals produced from said servo information bit cells of said servo information pattern sections being adapted to be averaged so that an average signal of the position signals is utillzed for positioning said read/write head.

2. The magnetic disk according to claim 1, wherein the number of said servo information pattern sections in said index servo sector is one of three, four and five.

3. The magnetic disk according to claim 2, wherein:
    the number of said servo information pattern sections is four.

4. The magnetic disk according to claim 1, wherein said servo information bit cells in each of said servo information pattern sections are spaced apart a predetermined distance in the direction in which said tracks extend, and each have a width substantially equal to the track pitch.

5. The magnetic disk according to claim 1, wherein each of said servo information pattern sections has first and second pairs of servo information bit cells spaced apart a predetermined distance in the direction in which said tracks extend and sequentially arranged in a direction perpendicular to the direction in which said tracks extend, said servo information bit cells each having a width smaller than the track pitch, said first pair of servo information bit cells being formed such that they have one end located on the center line of an even-numbered track and extend in opposite directions, and said second pair of servo information bit cells being formed such that they have one end located on the center line of an odd-numbered track and extend in opposite directions.

6. The magnetic disk according to claim 5, wherein each of said servo information pattern sections has first and second servo information pattern subsections, and said first and second pairs of servo information bit cells are formed in said first and second servo information pattern sub-sections, respetively.

7. The magnetic disk according to claim 1, wherein each of said servo information pattern sections has an erase section, a synchronizing section, a postion information detection section having said servo information bit cells formed therein, and another synchronizing section, said sections being arranged side by side in the direction in which said tracks extend.

8. A magnetic disk device for positioning a read/write head on a magnetic disk having a data area, adapted for writing and reading information by said read/write head, having tracks formed at a predetermined track pitch: and a servo sector embedded in said data area and having servo information patterns utilized for positioning said read/write head on a selected track, said servo sector including at least three servo information pattern sections aranged side by side in the direction in which each of said tracks extends, said servo information pattern sections each having at least one pair of servo information bit cells formed in a predetermined pattern in a direction perpendicular to the direction in which each of said tracks extends, said servo information bit cells each having a width smaller than or substantially equal to the track pitch, a pair of servo information bit cells of each of said servo information pattern sections being adapted to produce a position signal representing a difference between signals reproduced by said read/write head from said servo information bit cells, wherein said magnetic disk device comprises:
    position signal generating means responsive to said read/write head for generating the position signal on the basis of singals reproduced by said read/- write head from said pair of servo information bit cells of each of said servo information pattern sections: and processor means responsive to said position signal generating means for averaging position signals generated for said servo information pattern sections by said position signal generating means, and positioning said read/write head in accordance with an average position signal.

9. The magnetic disk device according to claim 8, wherein said position signal generating means generates effective position signals the number of which is smaller than that of said servo information pattern sections of said servo sector when at least one of said srvo information bit cells is dropped out: and said processor means averages the effective position signals generated by said position signal generating means to position said read/write head.

10. The magnetic disk device according to claim 8, wherein said processor means averages only position signals among position signals generated from servo information bit cells of said servo information pattern sections, which are in a predetermined range of magnitude.

11. The magnetic disk device according to claim 10, wherein said processor means averages position signals other than maximum and minimum position signals, and further averages only position signals which are in a predetermined range of magnitude with respect to an average value of the position signals other than the maximum and minimum position signals.

12. A magnetic disk used for writing and reading information by a read/write head comprising:

a data area, adapted for writing and reading information by said read/write head, having tracks formed at a predetermined track pitch; and a servo sector embedded in said data area and having servo information patterns utilized for positioning said read/write head on a selected track;

wherein said servo sector includes at least three servo information pattern sections arranged side by side in the direction in which each of said tracks extends, said servo information pattern sections each having first and second pairs of servo information bit cells spaced apart a predetermined distance in the direction in which said tracks extend, and sequentially arranged in a direction perpendicular to the direction in which said tracks extend, said servo information bit cells each having a width smaller than the track pitch, said first pair of servo information bit cells being formed such that they have one end located on the center line of an even-numbered track and extend in opposite directions, and said second pair of servo information bit cells being formed such that they have one end located on the center line of an odd-numbered track and extend in opposite directions, each of said first and second pairs of said servo information bit cells being adapted to produce a postion signal representing a difference between signals reproduced by said read/write head from said servo information bit cells, and position signals produced from said servo information bit cells of said servo information pattern sections being adapted to be averaged so that an average signal of said position signals is utilized for positioning said read/write head.

13. A magnetic disk used for writing and reading information by a read/write head comprising:

a data area, adapted for writing and reading information by said read/write head, having tracks formed at a predetermined track pitch: and a servo sector embedded in said data area and having servo information patterns utilized for positioning said read/write head on a selected track:

said servo sector including first and second pairs of servo patterns spaced apart in the direction in which said tracks extend and sequentially arranged in a direction perpendicuar to the direction in said tracks extend, each of said servo patterns having a width smaller than the track pitch, said first pair of servo patterns being formed such that they have one end located on the center line of an even-numbered track and extend in opposite directions, and said second pair of servo patterns being formed such that they have one end located on the center line of an odd-numbered track and extend in opposite directions, each of said first and second pairs of said servo patterns being adapted to produce a position signal representing a difference between signals reproduced by said read/write head from said paired servo patterns and utilized for positioning said read/write head on the selected track.

* * * * *